United States Patent [19]

Chilko

[11] 4,353,485
[45] Oct. 12, 1982

[54] APPARATUS FOR CONVEYING PARTICULATE MATERIAL BY SPRING EXPANSION AND CONTRACTION

[75] Inventor: Robert J. Chilko, Lower Burrell, Pa.

[73] Assignee: Aluminum Company of America, Pittsburgh, Pa.

[21] Appl. No.: 45,190

[22] Filed: Jun. 4, 1979

Related U.S. Application Data

[63] Continuation-in-part of Ser. No. 12,323, Feb. 15, 1979, abandoned.

[51] Int. Cl.³ ............................................. G01F 11/18
[52] U.S. Cl. .................................... 222/243; 198/533; 198/747; 222/409; 366/118; 366/241
[58] Field of Search ............... 222/196, 198, 200, 226, 222/227, 230, 233–235, 243, 244, 246, 409, DIG. 1; 366/114, 118, 241; 198/533, 630, 736, 747, 657, 716

[56] References Cited

U.S. PATENT DOCUMENTS

| 1,504,543 | 8/1924 | Draver . | |
|---|---|---|---|
| 2,065,095 | 12/1936 | Riegler . | |
| 2,174,348 | 9/1939 | Damond . | |
| 2,607,514 | 8/1952 | Keene . | |
| 2,652,954 | 9/1953 | Nowak, Jr. | 222/410 X |
| 2,782,962 | 2/1957 | Mercer | 222/243 X |
| 2,801,773 | 8/1957 | Vitkin | 222/200 |
| 3,166,222 | 1/1965 | Schrader . | |
| 3,187,958 | 6/1965 | Swart . | |
| 3,212,624 | 10/1965 | Hess . | |
| 3,338,472 | 8/1967 | Gardner | 222/235 X |
| 3,681,229 | 8/1972 | Lowe . | |
| 3,754,685 | 8/1973 | Kauppi | 22 2/409 X |
| 3,773,231 | 11/1973 | Wahl . | |
| 3,840,156 | 10/1974 | Fujimoto . | |
| 3,888,394 | 6/1975 | Tanaka et al. | 222/230 |
| 4,062,527 | 12/1977 | Schmitz . | |

FOREIGN PATENT DOCUMENTS

| 232709 | 2/1960 | Australia | 198/716 |
|---|---|---|---|
| 7308894 | 12/1974 | Netherlands | 222/243 |

Primary Examiner—Gil Weidenfeld
Assistant Examiner—Fred A. Silverberg
Attorney, Agent, or Firm—David W. Brownlee

[57] ABSTRACT

Apparatus is disclosed for moving particulate material such as alumina toward an outlet to a container while minimizing dispersion of dust into the atmosphere. The apparatus includes at least one coil spring which is disposed generally horizontally in the container with one end anchored to the container and the other end, which is disposed near the outlet, connected to a lever arm and crank for cyclically extending and contracting the spring. Such cyclic extension and contraction of the spring moves or at least encourages the flow of the particulate material to the outlet for gravity discharge therefrom and essentially eliminates problems of bridging and rat holes in the material.

6 Claims, 6 Drawing Figures

ENLARGED VI-VI ent application Ser. No.
APPARATUS FOR CONVEYING PARTICULATE MATERIAL BY SPRING EXPANSION AND CONTRACTION

CROSS-REFERENCE TO RELATED APPLICATION

This is a continuation-in-part of application Ser. No. 12,323, filed Feb. 15, 1979 now abandoned.

BACKGROUND OF THE INVENTION

1. Field of Art

This invention relates to apparatus for moving particulate material such as alumina toward the outlet of a bin or along the length of an elongate feeder duct.

2. Description of the Prior Art

Systems for conveying particulate material and for discharging such material from bins or other containers are well known in the art. For example, U.S. Pat. No. 3,681,229 discloses an alumina feeder in which a gas permeable hose is disposed in a conveyor duct for fluidizing alumina in the duct so the alumina will flow through the duct. That patent further discloses metering apparatus in which alumina is fluidized to cause it to move therethrough.

U.S. Pat. No. 3,212,624 discloses a vibratory screw feeder in which an auger pushes particulate material through a casing and which includes leaf springs mounted on the casing to vibrate it to produce a uniform density of material and more accurately control flow. U.S. Pat. No. 3,166,222 discloses a vibratory bin agitator to promote free uniform flow of powdery material from the bin. An aeriform fluid may be supplied through the stem of the vibrating mechanism to discharge into the material to further inhibit any tendencies of the powdery materials to bridge in the bin.

U.S. Pat. No. 3,754,685 is addressed to a discharge apparatus in which a cable having a plurality of spaced apart cone-shaped conveying elements on it is reciprocated back and forth to both agitate and convey material. The patent discloses use of such apparatus for conveying materials such as logs or wood chips. U.S. Pat. No. 2,607,514 is of interest for its disclosure of a powder dispenser with a conical coiled spring having its base fixedly secured and its apex pinned to the upper end of a rod which is reciprocated vertically to agitate powder and prevent it from being caked in the container.

Despite the numerous systems that are available for moving particulate materials, an improved system is desired which will convey powdery particulate material with a minimum of dust being dispersed into the atmosphere while also avoiding the other problems of bridging and non-uniform feeding rates.

SUMMARY OF THE INVENTION

This invention provides an improved system for moving powdery particulate material to the outlet of a bin or along the length of a conveyor duct using a coil spring which is cyclically extended and contracted to move the powdery material without dispersing dust into the atmosphere. The spring has one end connected to the container and extends substantially horizontally from such connection to the outlet where the spring is connected to means for cyclically extending and contracting the spring. Such cyclic extension and contraction of the spring causes the powdery particulate material to move toward the outlet of the container for gravity discharge therefrom.

Accordingly, an object of this invention is to provide means for conveying powdery material which minimizes dispersion of dust into the atmosphere.

Another object of this invention is to provide means for reducing the effective angle of repose of powder in a bin in order to permit more usable discharge of powder from the bin.

Another object of this invention is to provide apparatus for conveying powdery material and preventing the material from bridging in the container.

A further object of this invention is to provide a coil spring which is cyclically extended and contracted in a container of powdery material to cause the powdery material to move along the length of the spring.

The above and other objects and advantages of this invention will be more fully understood and appreciated with reference to the following description and the drawings attached hereto.

DESCRIPTION OF THE PREFERRED EMBODIMENTS

Figure 1:
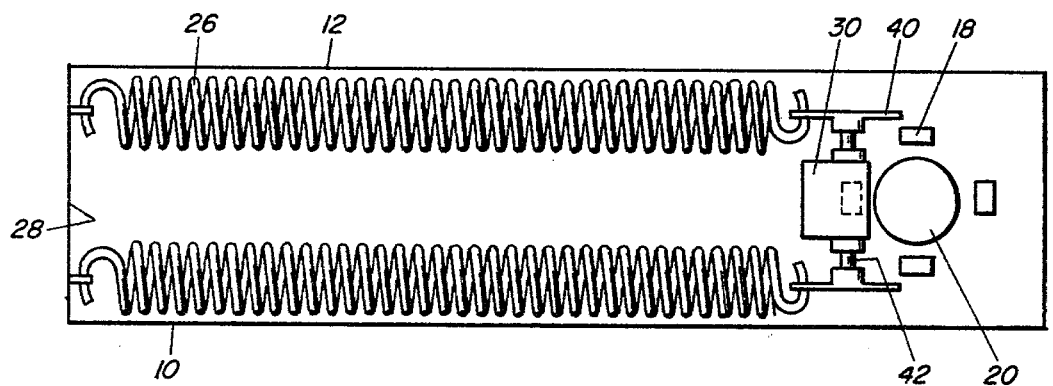
FIG. 1 is a top plan view of a bin feeder of this invention.

FIG. 1 illustrates an ore bin 10 which includes a housing 12 for containing ore 14 and means for reducing the effective angle of repose of the ore in the bin in accordance with this invention. The housing 12 has an open top for feeding ore into the bin and has a valved outlet 16 for discharge of ore from the bin into another container such as an electrolytic cell not shown. The outlet 16 includes four openings 18 in the bottom of the bin around a feeder housing 20 which has a feeder valve 22 in its base for controlling the discharge of ore from the bin. The housing 20 also has opening 19 in its wall for flow of ore into the housing and through outlet 16. A hydraulic or pneumatic cylinder not shown in the feeder housing 20 operates the valve 22 in response to external controls also not shown. The openings 18 in the bottom of the bin 10 feed the ore 14 into a conical section 24 around the base of the feeder housing 20 for flow of ore therethrough and discharge through the valve opening.

The purpose of the ore bin 10 is to hold a supply of ore 14 such as alumina for periodic controlled feeding of the ore as for example into an electrolytic cell. The bin is filled periodically as the supply of ore in it is depleted. For best operation of the bin, the ore should be substantially completely discharged therefrom without bridging of the ore in the bin. Additionally, most of the ore should be discharged from the bin between feeding to effectively use the full capacity of the bin. Accordingly, the angle of repose of the ore in the bin should preferably be relatively low so most of the ore can be discharged from the bin. It is therefore important that means be provided for avoiding bridging of ore in the bin and for moving ore from the left-hand side thereof to the outlet in the right-hand side of the bin for discharge through the outlet.

In accordance with this invention a plurality of helically coiled springs 26 are provided in the ore bin for moving the ore toward the outlet 16 of the bin, reducing the angle of repose of the ore in the bin and preventing bridging of ore. In the embodiment selected for illustration, four such coil springs 26 are provided. The springs 26 are fixedly secured to the wall 28 of the bin at a location removed from the outlet 16 and are connected at the other end to means for cyclically expanding and compressing the springs to move particulate material toward the outlet of the bin.

Figure 2:
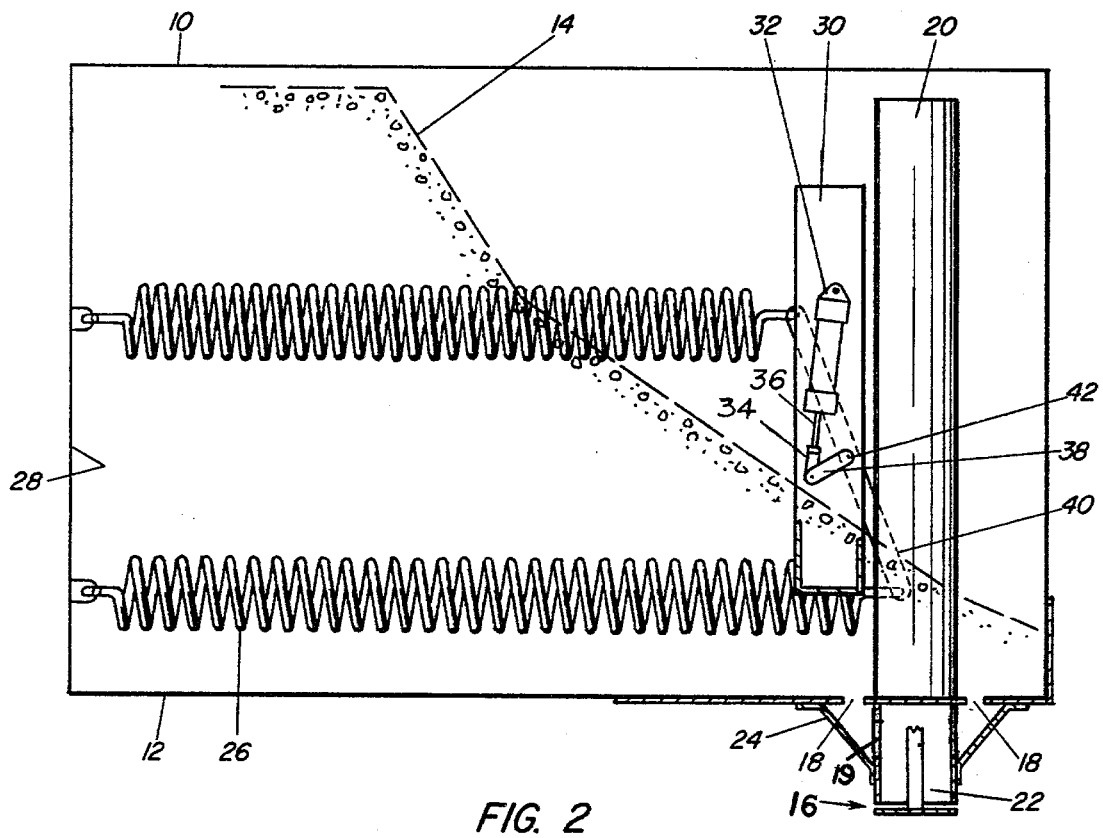
FIG. 2 is a cross-sectional view through the bin feeder of FIG. 1.

The apparatus for cycling the springs 26 may include a housing 30 (dust tight) with a hydraulic or pneumatic cylinder 32 in it, a clevis 34 on the end of the cylinder rod 36, a crank arm 38, two spring arms 40 and a pivot shaft 42. The pivot shaft 42 extends through the housing 30 and has a spring arm 40 fixedly attached on each end of the shaft on opposite sides of the housing so turning of the shaft by rotation of the crank arm will rotate the spring arms. The springs 26 which are attached to opposite ends of the spring arms will be extended and contracted by rotation of the spring arms. As illustrated in FIGS. 1 and 2, the two upper springs in the bin are shown in their compressed condition and the two lower springs in the bin are shown in their expanded condition. Operation of the cylinder 32 to retract the rod 36 will rotate the crank arms 38 and spring arms 40 clockwise to extend the upper springs and compress the lower springs. Repeated extension and retraction of the cylinder rod 36 will rotate the spring arms alternately clockwise and counterclockwise to cyclically extend and contract the springs 26 with the upper and lower springs moving in opposite directions.

Repeated or cyclic extension and compression of the springs causes the particulate material in the bin to be moved toward the movable ends of the springs and toward the outlet from the bin. The rate of such extension and compression is not critical and can be easily varied if desired. It has been found that cycling the springs one or more times each time there is a feed of alumina to the electrolytic cells (typically every 2 or 3 minutes) is sufficient to reduce the angle of repose of the ore in a bin such as that illustrated in FIGS. 1 and 2 and will permit substantially complete emptying of the bin. Cycling the springs also eliminates bridging and rat holes in the particulate material. In effect, the springs cause the ore to move toward the outlet for gravity discharge.

Figure 3:
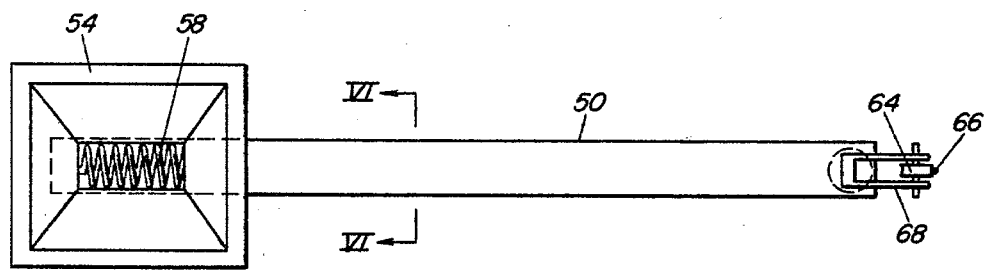
FIG. 3 is a top plan view of a conveyor system of this invention.
Figure 4:
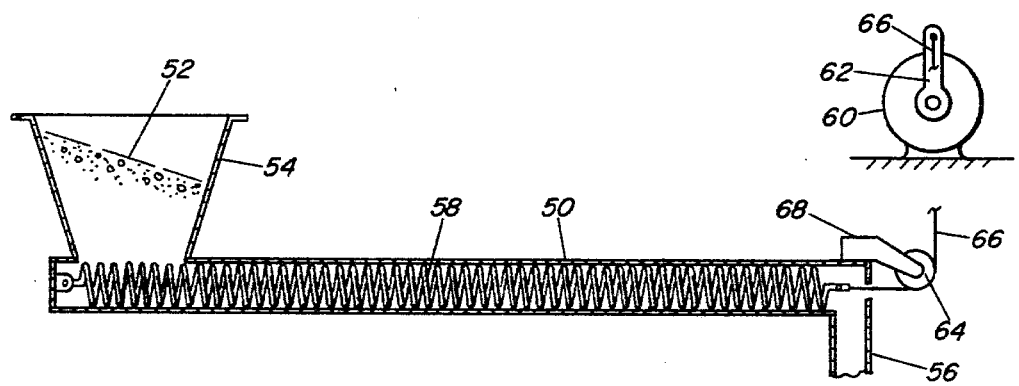
FIG. 4 is a longitudinal cross-sectional view through the conveyor of FIG. 3.
Figure 5:
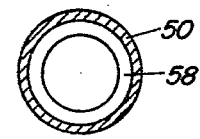
FIG. 5 is a transverse cross-sectional view through the conveyor of FIG. 3.

FIGS. 3, 4 and 5 illustrate an alternative embodiment of this invention in the form of a conveyor duct or transfer tube 50 for moving powdery material substantially horizontally from one location to another. In this embodiment, the transfer tube 50 moves particulate material 52 such as alumina from a hopper 54 which is mounted on one end of the duct to an outlet 56 on the other end of the duct. The transfer tube may be cylindrical as illustrated in FIG. 5, or may be rectangular or of other configuration. A helically coiled spring 58 is disposed in the transfer tube 50 and is secured to one end adjacent the hopper. The other end of the spring adjacent the discharge opening is connected to drive means for extending the spring and permitting it to contract to move particulate material through the transfer tube. In the embodiment selected for illustration, the drive means comprises a drive motor 60, a crank arm 62 on the motor, a pulley 64 mounted on the tube 50 with bracket 68 and a cable 66 connected between the crank arm and the end of the spring over the pulley which is mounted on the end of the transfer tube.

In the operation of the transfer tube 50, the drive motor 60 rotates the crank arm 62 to cyclically extend the coil spring and permit it to contract so as to move the particulate material 52 through the tube toward the outlet 56. The particulate material 52 is discharged from the outlet by the force of gravity. Although spring cyclic rate is not critical, it has been found that 100-150 cycles per minute will provide excellent transfer through the transfer tube illustrated in FIGS. 3-5.

Figure 6:
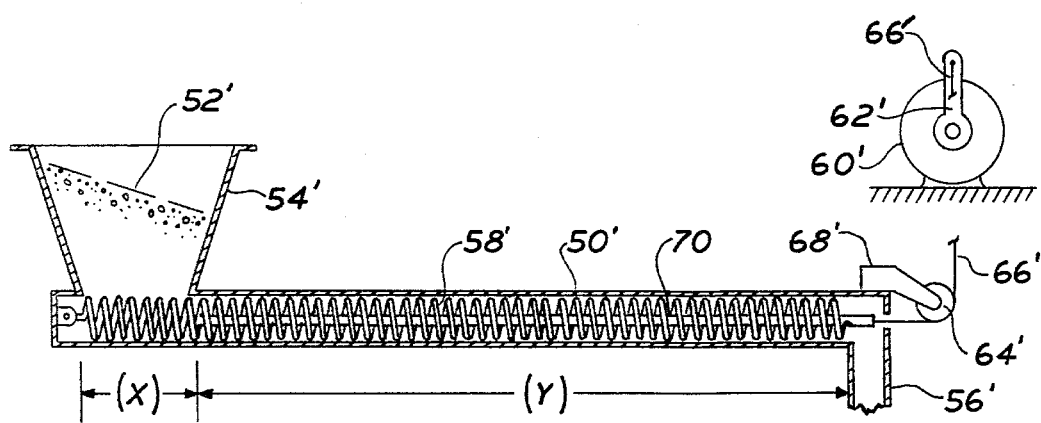
FIG. 6 is a longitudinal cross-sectional view of an alternative embodiment of a conveyor system of this invention.

FIG. 6 illustrates another alternative embodiment of this invention which is identical to the one illustrated in FIGS. 3, 4 and 5 except that only the coils (X) at the feed end of the conveyor 50' are individually active, i.e. expand and contract in length. As depicted in FIG. 6, all the conveyor parts which are the same as in the conveyor of FIGS. 3-5 are identified by the same numbers as in FIGS. 3-5 except the prime (') designation is used for the parts in FIG. 6. In the conveyor of FIG. 6, a rod 70 extends through most of the coils (Y) and is connected at its ends to the coils so there is no expansion or contraction of the coils (Y) through which the rod extends. Those coils move as a unit.

Since only the coils (X) in the feed end of the conveyor are free to expand and contract, those coils are more active, i.e. expand and contract further, in the embodiment of FIG. 6 than the same coils in the embodiment of FIGS. 3-5. The active coils (X) in the feed end of the conveyor 50' of FIG. 6 absorb the full stroke of the crank arm 62' since the other coils (Y) cannot expand or contract. In contrast, all the coils in the conveyor 50 of FIGS. 3-5 are individually active and incrementally absorb the stroke of the crank arm 62. Thus the coils under the feed end of that conveyor are not as active and don't move as much as do the coils (X) under the feed end of the conveyor in FIG. 6.

The conveyor 50' of FIG. 6 is particularly useful to minimize the stroke of operator arm 62' as for example in relatively long conveyors. Confining the expansion and contraction of the spring to the coils in the feed end of the conveyor produces flow rates which are substantially increased as for example by a factor of up to ten or more. For example, a three foot long conveyor with a rod 70 in it as illustrated in FIG. 6, having four inches of active coils (X) and an eight inch stroke of operator arm 62', provided a feed rate of 1000 pounds of alumina per hour through a two inch diameter conveyor tube 58'. In contrast, the same conveyor without rod 70 provided a maximum feed rate of 100 pounds of alumina per hour. In order to get the same flow rate with the conveyor of FIGS. 3-5 as with the conveyor of FIG. 6, it would be necessary to increase the stroke of the crank arm many times, and that is not always practical or possible. The embodiment of FIG. 6 produces high flow rates with short stroke operators.

Apparatus of this invention is a substantial improvement over the prior art apparatus because it does not disperse powdery material into the air as do fluidizing conveyors. This invention also does not compact the material as do screw conveyors and is more reliable than are vibratory conveyors. The cyclic extension and compression of the coil springs of this invention pushes the particulate material along the length of the spring toward the movable end of the spring. It is believed that the head of material at the fixed end of the spring resists movement of material toward that end of the spring. Accordingly, the reciprocating spring preferentially moves the particulate material in the desired direction toward the movable end of the spring with a minimum of agitation of the material and little or no dust dispersion into the air. Apparatus of this invention is relatively inexpensive to construct, simple to operate and free of mechanical difficulties. It is therefore seen that this invention provides a substantially improved apparatus for moving or encouraging the flow of powdery particulate material in a bin or conveyor duct.

What is claimed is:

1. Apparatus for moving particulate material substantially horizontally comprising a container having an inlet, an outlet and an unperforated bottom except for said outlet adjacent an end of said bottom, at least one coil spring disposed substantially horizontally in the container with one end of said spring anchored to the container distal from said outlet and the other end of the spring adjacent said outlet attached to means for cyclically extending and contracting at least a portion of said spring to move particulate material in the container toward said outlet for gravity discharge therefrom, said spring in its contracted state having gaps between adjacent coils and at least a major portion of said spring overlying said unperforated bottom.

2. Apparatus as set forth in claim 1 which includes two upper coil springs and two lower coil springs for moving the particulate material toward said outlet and preventing the material from bridging in the bin.

3. Apparatus as set forth in claim 1 in which said container is a transfer tube with one end of said spring secured to the tube near its inlet to move material from said inlet to the outlet.

4. Apparatus as set forth in claim 3 in which said tube is cylindrical.

5. Apparatus as set forth in claim 3 which includes means for rigidly connecting at least one coil of said spring near the outlet of the tube to at least one coil adjacent the inlet to the tube to limit expansion and contraction of the spring to the coils under the inlet while the others which are located between the connected coils move as a unit.

6. Apparatus for moving particulate material substantially horizontally, the apparatus comprising:
(a) a container having an inlet and an outlet;
(b) a lever arm mounted adjacent the outlet and having upper and lower portions;
(c) at least one upper and one lower coil spring disposed substantially horizontally in said container, each of said springs having one end thereof anchored to a common wall and having opposite ends attached to said lever arm, the upper spring being attached to the upper portion and the lower spring being attached to the lower portion, and;
(d) a crank arm attached to the center of the lever arm for cyclically rotating the lever arm in opposite directions for extending and compressing the springs to move particulate material towards the outlet.

* * * * *